(12) United States Patent
Yawalkar et al.

(10) Patent No.: US 10,983,903 B1
(45) Date of Patent: Apr. 20, 2021

(54) ENHANCED AUTOMATED PROTOCOL FOR SECURE APPLICATION TESTING

(71) Applicant: Amazon Technologies, Inc., Seattle, WA (US)

(72) Inventors: Piyush Pramod Yawalkar, London (GB); Yunquan Peng, London (GB); Bingqian Liu, London (GB); Andrew Gordon Jack, London (GB)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 16/255,488

(22) Filed: Jan. 23, 2019

(51) Int. Cl.
*G06F 11/36* (2006.01)
*H04L 12/26* (2006.01)
*G06F 3/0481* (2013.01)
*G06F 21/31* (2013.01)

(52) U.S. Cl.
CPC ...... *G06F 11/3688* (2013.01); *G06F 3/04817* (2013.01); *G06F 11/3684* (2013.01); *G06F 21/31* (2013.01); *H04L 43/103* (2013.01)

(58) Field of Classification Search
USPC ......................................................... 717/124
See application file for complete search history.

(56) References Cited

U.S. PATENT DOCUMENTS

| 7,925,952 | B1 * | 4/2011 | Katz | G06F 11/2294 714/736 |
| 8,862,950 | B1 * | 10/2014 | Ginsberg | G06F 11/3688 714/57 |
| 10,289,535 | B2 * | 5/2019 | Yadav | G06F 11/3688 |
| 2007/0288552 | A1 * | 12/2007 | Snyder | G06F 11/2294 709/203 |
| 2013/0080447 | A1 * | 3/2013 | Ramer | G06Q 30/0261 707/748 |
| 2017/0344467 | A1 * | 11/2017 | Yadav | G06F 11/3664 |
| 2018/0196731 | A1 * | 7/2018 | Moorthi | G06F 11/3664 |

* cited by examiner

*Primary Examiner* — John Q Chavis
(74) *Attorney, Agent, or Firm* — Knobbe, Martens, Olson & Bear, LLP

(57) ABSTRACT

Systems and techniques are disclosed for an enhanced automated protocol for secure application testing. An example method includes receiving, via a first component of a system and from a user device, selection of testing information, the testing information including a test device to perform one or more selected test suites, and the test suites being associated with an application. Test suite information is generated via a second component of the system based on the selected test suites, with the first component instructing the second component to generate the testing information according to the particular protocol. The test suite information is provided via the second component to the test device, with the test suite information being provided in response to polling from the test device. Test results are received via the second component, with the test results being routed by the second component to the first component for presentation via the user device.

23 Claims, 11 Drawing Sheets

US 10,983,903 B1

ENHANCED AUTOMATED PROTOCOL FOR SECURE APPLICATION TESTING

BACKGROUND

Applications (e.g., 'apps') are increasingly being relied upon to provide easy-to obtain discrete units of functionality. For example, a mobile device may enable access to an online application store. The application store may include applications from which a user may select. Upon selection, the user's mobile device may then execute the application to provide its associated functionality. Due to the breadth of such applications, the mobile device may provide a platform that enables far-reaching functionality. Additionally, the same applications may be utilized on different devices. For example, an application for editing documents may be utilized on a mobile phone. In this example, a user may additionally utilize the application on a tablet. In this way, the user may easily switch between devices while retaining a similar look/feel, functionality, and so on, across the devices.

It should be appreciated that ensuring an application successfully works across multiple devices requires a substantial amount of testing. Each device may have a unique operating system executing on the device. Thus, the application may have to be designed to work within different guidelines and with different application programming interface (APIs) calls. Additionally, the application may have to work with different versions of devices, operating systems, and so on. While testing of the application may, at least in part, be accomplished using software-based emulators, the applications may still need to be fully tested as working on actual device hardware.

For example, an application may undergo integration testing with respect to different devices. Integration testing may include the testing of different components of an application. It should be appreciated that an application may include native components, such as components which rely upon APIs associated with the devices, and scripting components, such as components which interface with native components. To perform integration testing, different combinations of components may undergo a series of tests to ensure consistency in functionality and performance.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
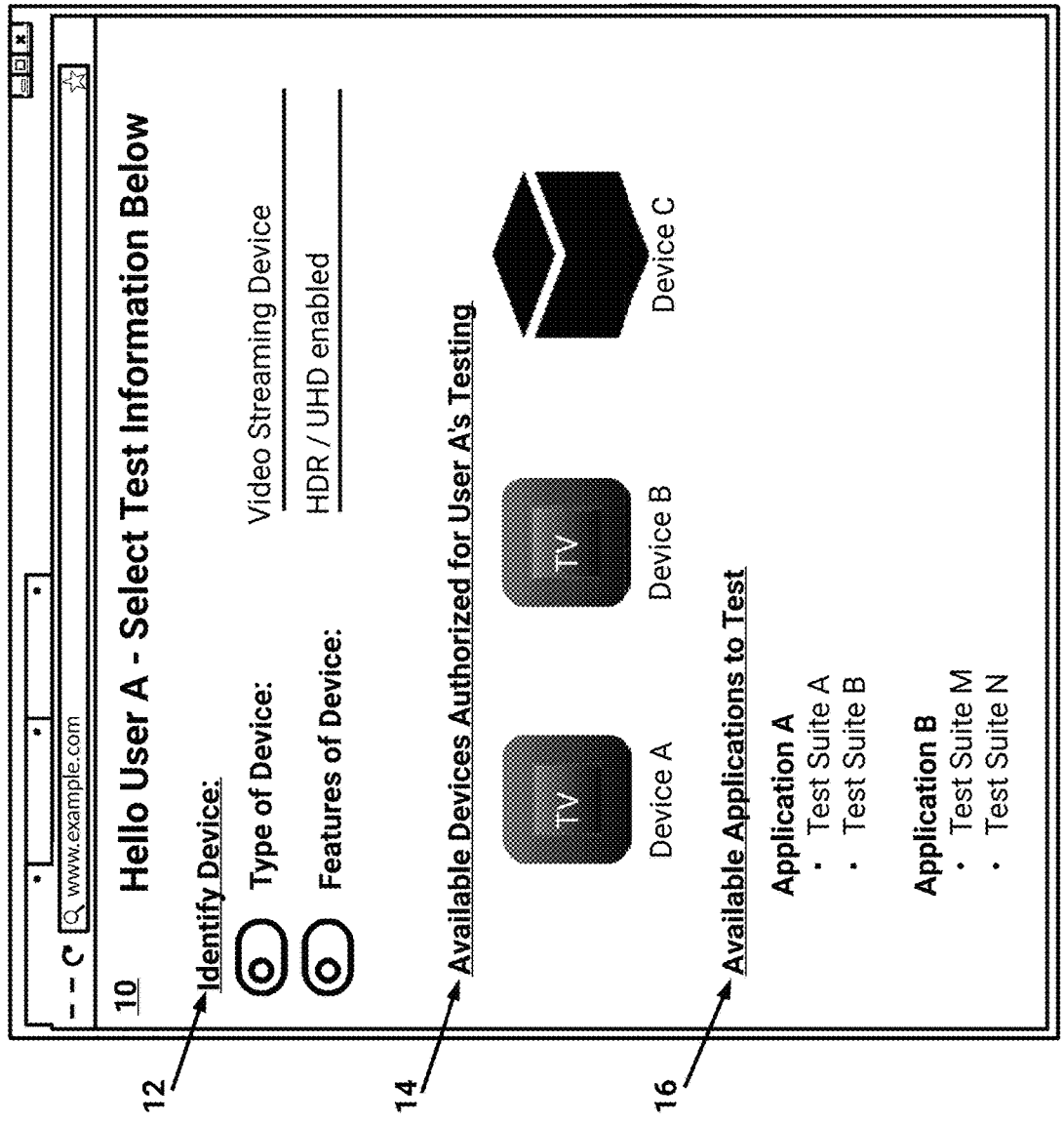
FIG. 1A illustrates an example user interface for selecting test devices to securely execute particular test suites.

Although particular embodiments are described herein, other embodiments, including embodiments that do not provide all of the benefits and features set forth herein, will be apparent to those of ordinary skill in the art.

INTRODUCTION

This specification describes a protocol, or scheme, to securely execute test suites associated with different applications. A test suite may represent one or more automated tests of an application's functionality or performance. Using the protocol, a user may rapidly cause initiation of test suites to be performed by different devices. For example, a device may include any user device which can access an application store (e.g., an online 'app' store). Example devices may include a mobile device, a wearable device, a tablet, a laptop, a streaming device, and so on.

An application may be tested to ensure that its functionality performs correctly, and within certain guidelines, for each type of device on which the application is available. An example of an application may be a video streaming application. For this example application, the application's functionality (e.g., video streaming) may be, in part, tested using software-based emulator schemes. However, such testing may not surface problems related to the integration of the application on a device. As an example, the application may have audio and video synchronization errors which are only existent when the application is executing on a device. As another example, the application may drop video frames when outputting video to a television or display. These errors may be different depending on a type of device executing the application. For example, a first type of device (e.g., a mobile device) may properly synchronize audio and video. However, a second type of device (e.g., a streaming device) may produce errors. Thus, the application may benefit from testing on both the first type of device and second type of device. In this way, the application may be vetted across different types of devices to ensure the application's success.

The protocol described herein advantageously enables testing of an application prior, and subsequent, to an application's public availability on different devices. A first type of testing, referred to herein as 'integration testing', may include executing test suites related to specific components (e.g., code modules) of an application. The first type of testing may thus be tested on devices prior to the application being publicly available. Optionally, the first type of testing may be performed on devices which are not provided to end-users (e.g., debug devices, non-production devices). A second type of testing, referred to herein as a 'end-to-end' testing, may include executing test suites related to a full application. For example, end-to-end testing may represent a final stage of testing prior to the application being publicly available. As another example, end-to-end testing may be performed on an application subsequent to it being publicly available. This testing may optionally be performed on devices which are utilized by end-consumers. To perform the first type and second type of testing, a device agent (e.g., client) may be loaded onto, or otherwise installed on, a device. As will be described, the device agent may be utilized to drive performance of different test suites related to an application.

Advantageously, the protocol can enable the rapid identification of devices available to perform tests. The protocol may then enable the rapid testing of test suites on the identified devices. For example, an application designer may access a web application associated with systems described herein. The web application may provide a centralized user interface for the application designer to quickly cause initiation of testing by different devices. Additionally, the centralized user interface may then provide succinct summary information generated from test results received from the different devices.

A first example scheme to test applications, which does not utilize the protocol described herein, may require an application designer to interface with specific devices. For example, the application designer may be required to physically handle a device and load an application being created onto the device (e.g., via a wired connection). With respect to a non-production device, the application designer may cause the device to be placed into a debug mode. This debug mode may allow such test suites to be loaded (e.g., sideloaded). The application designer may then utilize the application on the device (e.g., provide user input to the application) and determine whether any bugs or errors are existent. For example, with respect to a streaming application, the application designer may measure whether any video frames are being dropped. To determine this measurement, the application designer may cause the application to output certain information to be utilized in determining whether any frames are being dropped. In this way, the application designer may be required to utilize (1) an application which has been modified for testing, and thus which is not production level, and (2) to physically manipulate devices.

In contrast, the protocol described herein can enable the automatic identification of devices which are authorized to perform testing. An authorized device may optionally include a device which has affirmatively indicated (e.g., by a user) that is authorized to perform testing. Additionally, the protocol can enable these devices to automatically obtain test suites related to applications and then execute the test suites. Thus, in contrast to the first example scheme, the application designer may leverage the protocol to control testing via a central user interface. For example, the central user interface may enable selection of one or more devices to perform testing. The central user interface may then cause specific test suites to be performed by the selected devices. In this way, the application designer may avoid being required to physically manipulate devices. Instead, the devices may include any device which can communicate via the protocol with the systems described herein.

Overview

As described above, an application designer (e.g., referred to herein as a user) may utilize a user device (herein referred to as a 'requesting device') to access a user interface to initiate testing of an application. Using the user interface, the user may cause selection of one or more devices (herein referred to as 'test devices') to perform a test suite related to the application. A first system described herein (e.g., the user/device authorization system 100) may then validate that the user is authorized to initiate the testing. Advantageously, the first system may also validate that the user is authorized to initiate testing on test devices selected by the user. For example, the user may be required to provide authentication information. The authentication information may limit the user's access to particular test devices, particular test suites, viewing of particular test results, and so on. In this way, the user may be allowed to initiate testing only on a specific subset of the test devices in communication with the systems described herein.

Upon the above-described validation, the first system may then store test suite information sufficient to enable the selected test devices to perform testing. Example test suite information may include drivers, test scripts, and so on, which cause performance of the test suite.

A second system described herein (e.g., the secure device access system 110), may then provide the test suite information to the test devices. Upon execution of the test suite, the second system may receive the results and enable access to the results by the user. Advantageously, access to test devices may be constrained. For example, the second system may be configured to solely provide information to, and receive information from, the test devices. Indeed, the user of the requesting device may optionally have no access to the test devices, and certain information related to the test devices may be masked or otherwise rendered inaccessible. For example, identifying information related to the devices may be hidden from the user. Instead, the devices may be selected by the user based on anonymized information (e.g., an anonymous identifier). Thus, the second system may utilize the anonymized information to identify a corresponding test device (e.g., a network location of the test device). In this way, the user's sole interactions may be constrained to the user-facing first system described above.

The second system may provide the test suite information to device agents executing on the test devices. As described above, the device agents may be utilized to drive the testing of an application. Examples of testing may include integration test and end-to-end testing which are described below in turn.

With respect to an integration test, in which components of an application are tested, the second system may provide the components to be tested. The device agent may then perform the testing using the components. Optionally, the device agent may utilize drivers, test scripts, and so on, which are sufficient to enable execution of the components.

With respect to end-to-end testing, in which a full application may be tested, the test devices may have the application currently installed. For example, the application may be publicly accessible, and the test devices may be devices of end-users. As another example, the application may be obtained by the test devices prior to testing.

In the example of end-to-end testing, the application may comprise a particular software component (referred to herein as a WebSocket patch) which may respond to instructions received from the device agent. The WebSocket patch may optionally represent a WebSocket, which can communicate with the device agent. This WebSocket patch may receive instructions from the device agent based on the received test suite information. For example, the device agent may mimic user input which would be provided to the application. As an example, the device agent may mimic user input provided to a user interface generated by the application. The WebSocket patch may optionally be included in the application (e.g., a production level version of the application). Thus, the WebSocket patch may enable advanced testing both prior, and subsequent to, public availability of the application.

Upon execution of the test suite information by the test devices, the second system may receive test results. Optionally, the second system may aggregate the test results from the test devices. The received test results may then be stored by the second system. The user may utilize the central user interface described above to request the test results, and the first system may validate that the user is authorized to access the test results. Upon validation, the first system may then route the request to the second system. The second system may then securely provide the test results to the first system for presentation to the user.

As will be described below, with respect to at least FIGS. 1A-1D, the user may utilize the user interface to search for test devices which match certain features related to the testing. With respect to a streaming application, the user may cause testing to be initiated on test devices which are capable of outputting high-dynamic range video content. Additionally, the user may cause testing to be initiated on test devices which are connected to televisions or displays capable of presenting high-dynamic range video content. In this way, the user may tailor testing to specific test devices.

Example User Interfaces/Block Diagrams

Described below are examples of user interfaces utilized to cause performance of testing on test devices. The user interfaces may further be utilized to view test results associated with the testing. A requesting device (e.g., the requesting device 120 illustrated in at least FIG. 1B) may present the example user interfaces and receive user input from a user of the requesting device.

Optionally, the user interfaces may be rendered by a browser executing on the requesting device. For example, the user interfaces may be associated with a web application executing on a system (e.g., the user/device authorization system 100, or a presentation system in communication with the system 100). The system may be in communication with the requesting device via a network (e.g., the internet). In this example, the system may generate, at least in part, the user interfaces (e.g., user interface information 104 illustrated in FIG. 1B). The requesting device may then render the user interfaces. Additionally, the requesting device may receive user input from the user and route the user input to the system to update the user interfaces.

The user interfaces may also be associated with an application (e.g., an 'app') executing on the requesting device. In this example, the application may render, at least in part, the elements presented in the user interfaces. The system may provide information to the requesting device for inclusion in the user interfaces. For example, the system may provide information indicating devices upon which the user is authorized to initiate testing. The requesting device may thus receive this provided information and include it in the user interfaces.

FIG. 1A illustrates an example user interface 10 for selecting test devices to securely execute particular test suites. As described above, a user may utilize the user interface 10 to identify, or otherwise select, test devices which are to perform testing. In the example of FIG. 1A, the user interface 10 includes a portion 12 to specify features associated with test devices. It should be appreciated that certain test suites may be directed to testing of different aspects, or components, of an application. For example, a test suite may be designed to test the proper rendering of 4 k video or high dynamic range video generated by an application. As another example, a test suite may be designed to test whether devices with certain processors, or processing ability, can render video game content at greater than a threshold number of frames per second.

The portion 12 may therefore be utilized by the user to specify features of interest. The specified features may relate to hardware features or software features of test devices. With respect to hardware features, an example hardware feature may include an indication of a type of the device. Examples types may include a mobile device, tablet, wearable device, laptop, streaming device, a thin client, and so on. Another hardware feature may include an indication of a specific hardware component. For example, certain test suites may be designed to ensure compatibility with specific hardware components. Thus, as new processors, modems, graphics processing units, and so on, are included in devices, test suites may be leveraged to test these components. Hardware features may additionally be based on specific functionality or abilities afforded by test devices. As described above, example functionality for a streaming device may include a maximum resolution at which the streaming device can present video content. Additional functionality or abilities may include whether the device has a touch-screen, one or more cameras, certain wireless functionality (e.g., Bluetooth, WiFi), and so on.

With respect to software features, an example software feature may relate an operating system executing on the device. For example, the user may specify that the test devices execute ANDROID, IOS, and so on. In this example, the user may further specify a particular version of the operating system. In this way, as new versions of operating systems are released the user may ensure compatibility with an application. Another example software feature may relate to other applications executing on devices. For example, certain test suites may test the interoperability between an application and one or more other applications.

Additionally, the portion 12 may enable specification of certain features which are associated with devices or systems connected to test devices. With respect to a streaming device, an example feature may relate to a television or display connected to the streaming device. The user may thus specify test devices which are connected to televisions capable of presenting high dynamic range content. In addition to high dynamic range content, the user may also specify that the test devices are to be connected to certain audio equipment. The user may indicate that the audio equipment may, for example, be configured to process certain audio formats (e.g., certain surround sound audio formats).

As will be described below, with respect to at least FIG. 3, information associated with test devices may be stored by a system (e.g., the user/device authorization system 100). The information may reflect the hardware or software features described above, and may optionally reflect information associated with connected devices or systems. Thus, the specified features in portion 12 may be utilized by the system to determine test devices which satisfy the specified features.

In the example of FIG. 1A, the user has specified, in portion 12, that the test devices are to be video streaming devices. Additionally, the user has specified that the video streaming devices are to be capable of outputting high dynamic range content and ultra-high definition content (e.g., 4K video, 8K video, and so on).

In portion 14, user interface 10 identifies test devices which satisfy the specified features. For example, the portion 14 graphically illustrates Device A, Device B, and Device C.

Optionally, the user interface 10 may respond to user input directed to each presented test device. For example, in response to user input (e.g., mouse click, touch-screen interaction, verbal command, and so on) directed to Device A, the user interface 10 may update to present detailed information associated with Device A. Example detailed information may include operating system information (e.g., a type of operating system, version, and so on), bandwidth available to Device A (e.g., a network connection speed), or any of the hardware or software features described above.

As will be described in more detail, with respect to FIG. 4, the test devices included in portion 14 may be validated by a system prior to inclusion in the user interface 10. Validation may include determining that the user is authorized to initiate testing on the test devices. In some embodiments, the user may be limited to initiating testing on test devices which are on a same network, or subnet, as the requesting device utilized by the user. Thus, in these embodiments the user may be authorized to initiate testing only on local test devices. In some embodiments, the user may be authorized to initiate testing on certain types of devices (e.g., streaming devices) and not on other types of devices (e.g., mobile devices). Additionally, the system may validate that the test devices have been authorized to perform testing. For example, end-consumers may provide affirmative 'opt-in' responses prior to tests being performed on their devices. Thus, devices of these end-consumers may be included in portion 14 based on the affirmative responses.

Portion 16 identifies applications available for testing. The user of user interface 10 may specify a particular application which is to be tested. For example, portion 16 indicates that Application A and Application B may be tested. In this example, Application A and Application B may be available for testing on at least one of the test devices identified in portion 14. Optionally, the user may sort the identified applications according to their inclusion on the test devices identified in portion 14. For example, if Application A is included on Devices A-B, and Application B is included on Device C, then the portion 16 may include Application A first (e.g., higher in user interface 10).

Additionally, portion 16 enables selection of one or more test suites to be performed. As illustrated, Applications A and B each include two test suites which may be selected. Advantageously, the test suites may have been previously uploaded by one or more other users, or the user may have uploaded to the test suites. Thus, the user may leverage all previously utilized, or uploaded, test suites. Optionally, the previously utilized, or uploaded, test suites may be associated with access controls. Thus, the test suites included in portion 16 may reflect test suites which the user is authorized to select.

Optionally, user interface 10 may respond to user input directed to a particular test suite. For example, upon user input directed to test suite A, the user interface 10 may update to reflect detailed information associated with test suite A. An example of detailed information may include a description of the specific tests that are to be performed. This description may be specified by another user, or may be automatically generated. With respect to automatic generation, a system may review the specific application functionality implicated by testing scripts associated with test suite A. Thus, the system may generate an indication of the functionality being tested. Optionally, the user interface 10 may graphically illustrate prior test results generated based on test suite A. In this way the user may quickly ascertain whether test suite A tests functionality of interest to the user.

In this way, the user may utilize user interface 10 to select test devices (e.g., via user input directed to portion 14) to perform testing of test suites. Additionally, the user may select the test suites to be performed. As will be described below, with respect to FIGS. 1C-1D, the user interface 10 may then update to present test results associated with the testing.

Figure 1B:
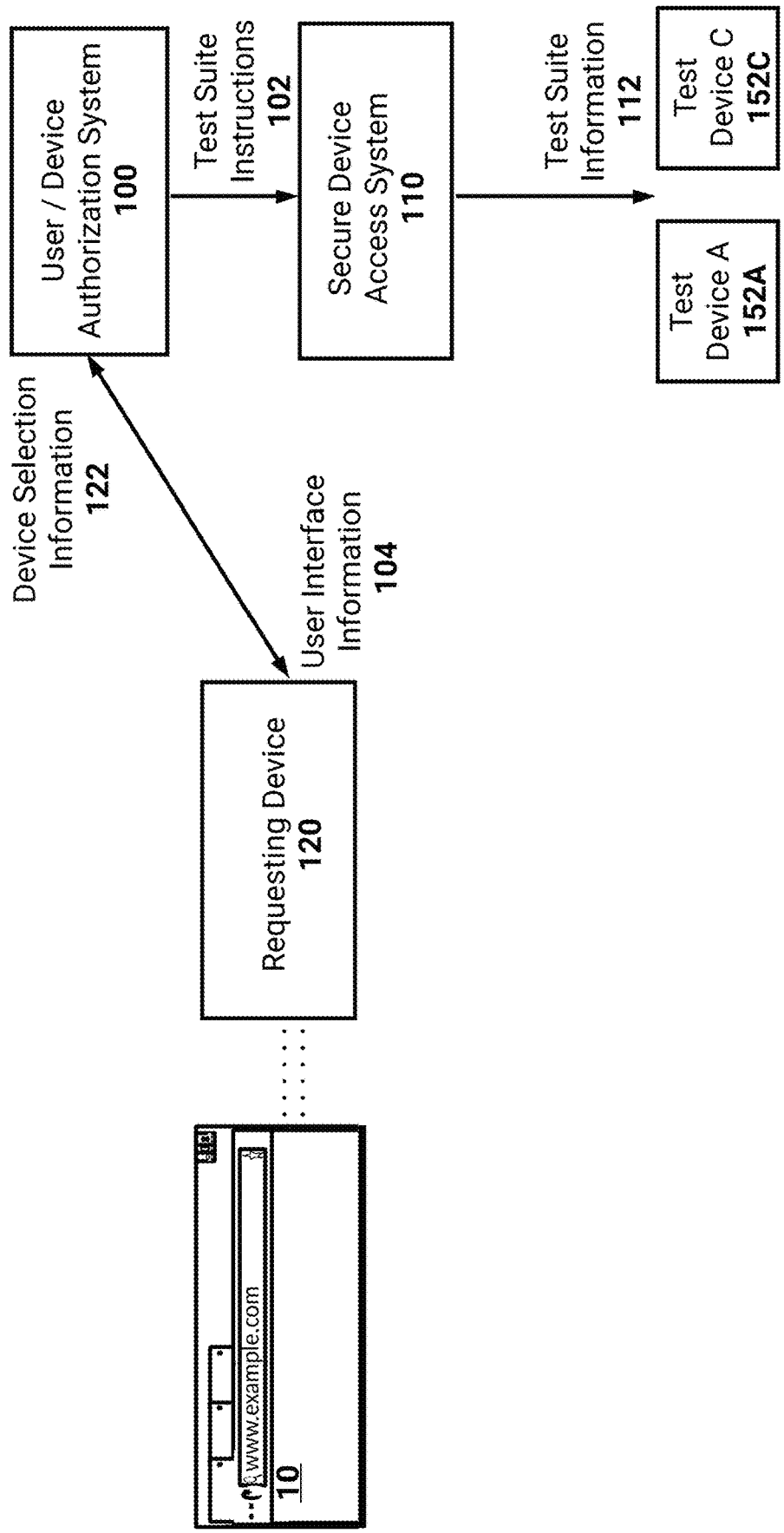
FIG. 1B illustrates a block diagram of systems that provide one or more test suites to test devices.

FIG. 1B illustrates a block diagram of systems 100, 110, that provide one or more test suites to test devices A, C, 152A, 152C. As described above, the user of user interface 10 may specify particular devices which are to perform one or more test suites. In the example of FIG. 1B, the user has specified test devices A and C. The requesting device 120 has then provided device selection information 122 to the user/device authorization system 100. The device selection information 122 may indicate the specified test devices and associated test suites.

Upon receipt of the device selection information 122, the user/device authorization system 100 may provide test suite instructions 102 to the secure device access system 110. The test suite instructions 102 may comprise test suite information which is sufficient to enable test devices A, C, to perform the selected test suites. For example, the test suite information may comprise drivers and/or test scripts. In some embodiments, the test suite instructions 102 may enable the system 110 to obtain the test suite information from an authorized system. In this example, the test suite instructions 102 may thus comprise a network address (e.g., a uniform resource locator address) from which the test suite information may be obtained.

The test suite instructions 102 may further identify test devices A, C according to anonymized identifiers. As will be described, the test devices A, C may each execute a software agent. The software agents may each be associated with respective anonymized identifiers (e.g., device IDs). In this way, specific network locations, or other sensitive information, of test devices may be obfuscated.

To provide the test suite information 112 to test devices A, C, the test devices may periodically poll the secure device access system 110. For example, the polling may be performed via message queuing telemetry transport (MQTT). Each test device may request that the system 110 identify whether any tests are associated with their anonymized identifier. In the example of FIG. 1B, test device A may poll the system 110. The system 110 may then identify whether test device A was selected by the requesting device 120. Upon a positive identification, the system 110 may then provide test suite information 112 in response to a polling request.

Optionally, the polling may occur based on use information associated with the test devices. For example, a test device may poll the system 110 if it has been not been used for a threshold period of time (e.g., used by an end-user, or used to perform testing). With respect to devices utilized by end-users, a device may poll the system 110 during a time period if the device is not normally used during that time period. For example, if the device is a streaming device then the streaming device may poll the system 100 during work hours or late at night.

In some embodiments, the secure device access system 110 may push the test suite information 112 to the test devices A, C. In these embodiments, the system 110 may thus maintain information indicative of a network location associated with each test device. For example, the system 110 may store internet protocol (IP) addresses of the test devices, MAC addresses of the test devices, and so on.

The test devices A, C may then utilize the test suite information 112 to perform testing. As will be described in more detail below, with respect to at least FIGS. 5A-5B, the tests may comprise integration tests or end-to-end testing. As described above, an integration test may be utilized to test specific components of an application. For example, components of the application (e.g., code modules) may be tested. In these tests, the test suite information 112 may be executed by a device agent on the test devices A, C. An end-to-end test may be utilized to test a full application. In these tests, the test suite information 112 may be similarly executed by the device agent. Since end-to-end testing tests the full application, the device agent may provide instructions to the application. For example, user input may be automatically provided to user interfaces generated by the application, and so on. Thus, the device agent may control the application based on the test suite information 112.

Subsequent to performance of the testing, the test devices A, C may provide test results to the secure device access system 110 (e.g., via HTTPS). As will be described in FIG. 1C, the secure device access system 110 may then route the test results to the requesting device 120 for presentation. For example, the system 110 may route the test results via the user/device authorization system 100. As another example, the system 110 may store the results in a secure cloud storage system accessible to the user of the requesting device 120.

Figure 1C:
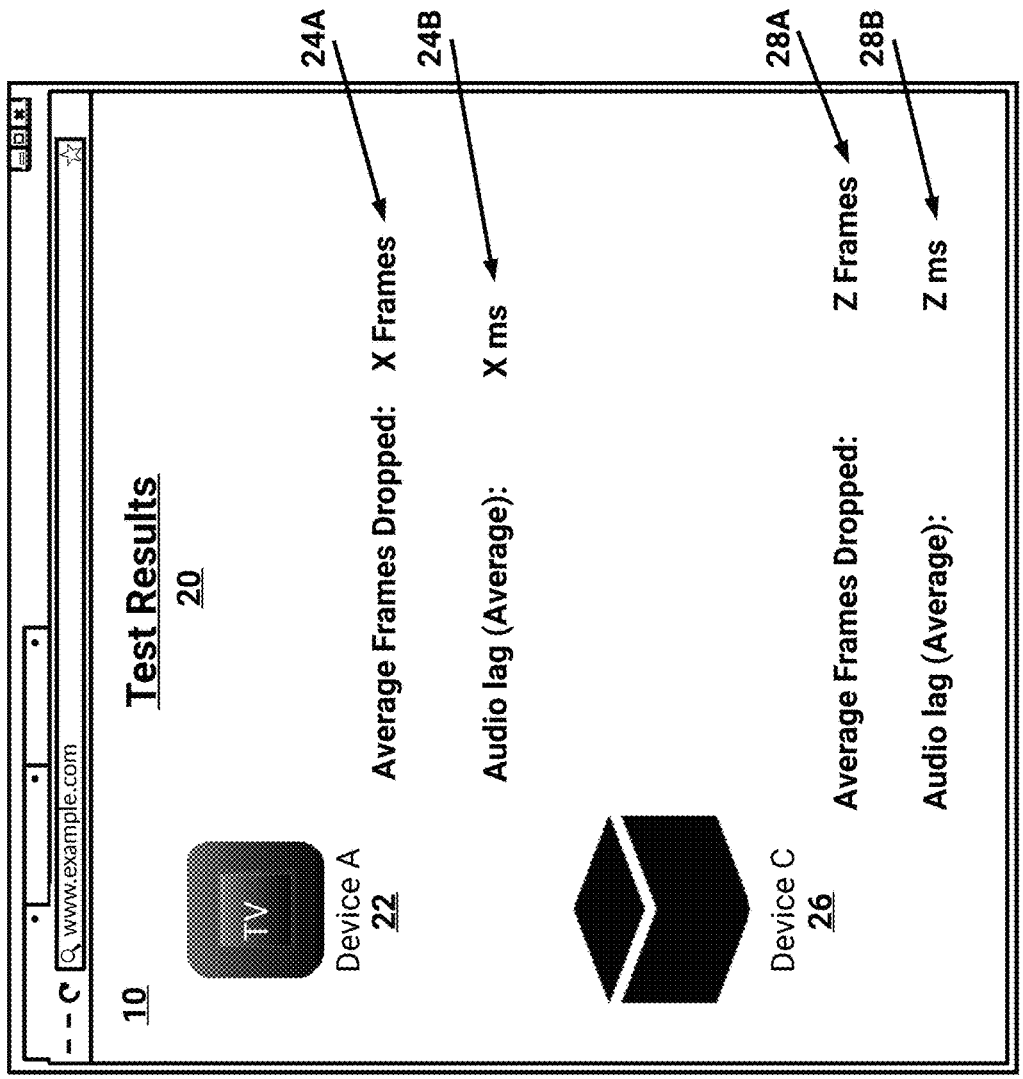
FIG. 1C illustrates an example user interface for presenting test results associated with secure execution of test suites.

FIG. 1C illustrates the example user interface 10 presenting test results 20 associated with secure execution of test suites. As described in FIG. 1B, test devices may execute test suites selected by the user of the user interface 10. Subsequently test results may be presented in the user interface 10. For example, the secure device access system 110 may aggregate the test results received from the selected test devices.

As illustrated in FIG. 1C, the test results 20 are presented for Device A 22 and Device C 26. In the example, a first example test suite selected by the user included tests related to a number of average frames (e.g., video frames) dropped during playback of video content. A second example test suite included a measurement associated with average audio lag. For example, audio lag may represent a time difference between when audio was triggered to be played and when the audio was output via a test device. Thus for Device A 22, a first measurement 24A and a second measurement 24B are included. Similarly for Device C 26, a first measurement 28A and a second measurement 28B are included. FIG. 1C illustrates example test results related to average frames dropped and audio lag. In some embodiments, test results may relate to a time to launch an application, whether a user interface performs correctly (e.g., based on mimicked user input), measures of resources which an application utilizes (e.g., memory usage), whether video is encoded and/or decoded properly, and so on.

While the example test results 20 present single values generated based on performance of the test suites, it should be understood that more detailed information may be presented. For example, the user may provide user input to a particular value 24A as measured by Device A 22. In response, the user interface 10 may update to reflect additional measurements generated by Device A 22. As an example, the additional measurements may reflect periodic measurements of a number of frames dropped. As another example, the additional measurements may reflect the raw data generated by Device A 22.

Figure 1D:
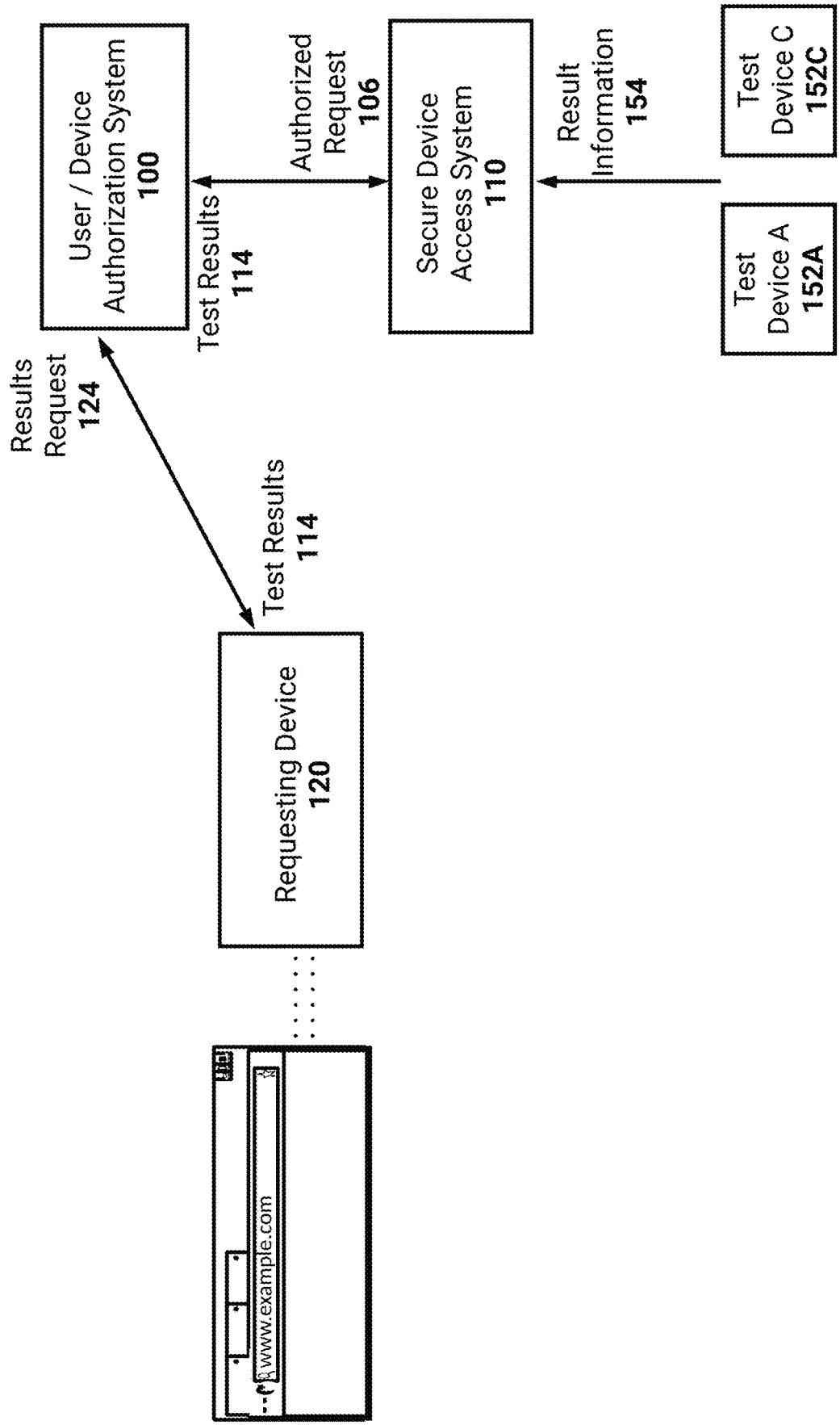
FIG. 1D illustrates a block diagram of systems that present test results associated with test suites.

FIG. 1D illustrates a block diagram of systems 100, 110, that present test results 114 associated with test suites. As described above, the requesting device 120 may view test results 114 generated in response to the test devices A, C performing test suites. Upon completion of the test suites, each test device may provide (e.g., as a push) result information 154 to the secure device access system 100. The secure device access system 110 may then store the result information 154.

Optionally, the secure device access system 110 may aggregate the result information 154 received from test devices A, C. While FIG. 1C illustrated the test results 20 as being separated according to test device, the secure device access system 110 may also generate a holistic view associated with the test suites. With respect to FIG. 1C, the user interface 10 may present an average number of frames dropped across the test devices A, C.

The secure device access system 110 may optionally receive instructions regarding aggregation schemes. For example, the user of the requesting device 120 may select one or more test devices and test suites (e.g., as described above). The user may additionally indicate that the generated test results are to be combined according to a particular model (e.g., selected or provided by the user). Examples of models may include machine learning models, Bayesian models, and so on. Optionally, the models may include prior generated test results. For example, the prior generated test results may be related to a same set of test suites, or different test suites. Thus, the secure device access system 110 may supplement the prior generated test results.

The user of the requesting device 120 may cause a results request 124 to be provided to the user/device authorization system 100. Similar to the validation scheme described in FIG. 1B, the user/device authorization system 100 may determine whether the user is authorized to receive the test results 114. For example, the user/device authorization system 100 may store information associating certain test suites with users who requested performance of the test suites. Optionally, the user may be associated with a group of users or a team. Thus, the user may optionally be authorized to view any test results 114 associated with test suites requested by the user's team. In this way, the user/device authorization system 100 may track whether a user is authorized to receive test results 114.

In some embodiments, the secure device access system 100 may provide information to the user/device authorization system 100 indicating completion of the test suites. In this way, the user/device authorization system 100 may update a user interface presented via the requesting device 120 to reflect the completion. Optionally, the user/device authorization system 100, or requesting device 120, may generate notifications to be provided to the user. Example notifications may include texts, email, automated phone calls, data pushes to an application utilized by the user (e.g., on the user's mobile device), and so on.

Upon validation of the user, the user/device authorization system 100 may provide an authorized request 106 to the secure device access system 110. The authorized request 106 may be signed based on a public key/private key scheme. In this way, the system 110 may confirm the validity of the authorized request 106. As described above, the secure device access system 110 may store the result information 154 obtained from the test devices A, C. Thus, in response to the authorized requested 106 the secure device access system 110 may provide the test results 114.

The test results 114 may then be provided for presentation to the requesting device 120.

Block Diagram Illustrating Protocol

Figure 2:
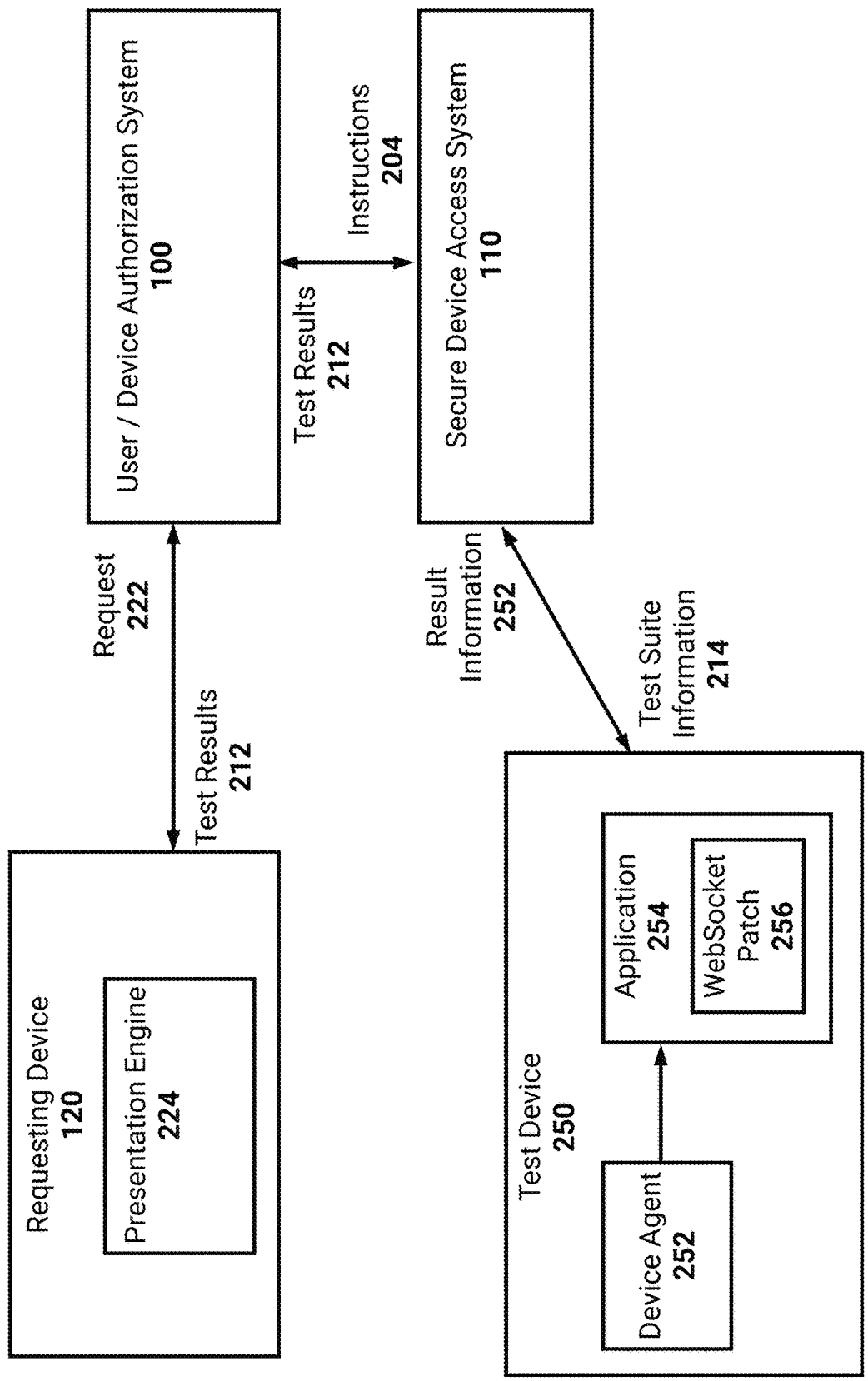
FIG. 2 illustrates a block diagram of a requesting device, test device, and systems according to the secure protocol described herein.

FIG. 2 illustrates a block diagram of a requesting device 120, test device 250, and systems 100, 110 according to the secure protocol described herein. The systems 100, 110 illustrated in FIG. 2 may each comprise systems of one or more computers, one or more virtual machines executing on a system of one or more computers, or one or more components associated with a same system. With respect to the example of components, the user/device authorization system 100 and secure device access system 110 may each represent particular services associated with the protocol.

For example, the user/device authorization system 100 may represent a service which provides particular application programming interface (API) calls. An example of an API call may include an API to determine what test suites may be executed on a test device. As another example, an API call may include an API to determine which test suites should be executed on a test device. In this example, the API call may cause identification of the test suites previously performed on the test device. The API call may then determine whether there any remaining test suites for the test device to perform. As another example, an API call may include an API to validate that a user is authorized to execute test suites on a test device. As another example, an API call may include an API to provide instructions to the secure device access system 100. Example instructions may include instructions to initiate performance of one or more test suites by one or more test devices.

The secure device access system 110 may represent a service which provides API calls associated with executing test suites. The secure device access system 100 may communicate with test devices, for example test device 250. In some embodiments, the user/device authorization system 100 may communicate with test devices via a secure service or platform. In this example, the system 100 may utilize, for example, AWS IoT to securely communicate with devices. Private key certification may be leveraged to communicate with the test devices.

An example of an API call may include an API to set which test suites may be executed on a test device. Another example of an API call may include an API to provide test suites to test devices based on instructions received from the user/device authorization system 100. Another example of an API call may include an API to provide test results to the user/device authorization system 100.

As described in FIGS. 1A-1D, the requesting device 120 may present a user interface for interaction via a user. As illustrated, the requesting device 120 includes a presentation engine 224 associated with presenting the user interface. The presentation engine 224 may, in some embodiments, be a web browser which renders a web page associated with the user/device authorization system 100. In some embodiments, the presentation engine 224 may be an application executing on the requesting device 120. The application may optionally be an application obtained from an online application store (e.g., an 'app').

The requesting device 120 may provide requests 222 to the user/device authorization system 100 to perform particular functionality. For example, FIG. 1B describes the requesting device 120 providing a request 222 to cause initiation of selected test suites by selected test devices. As another example, FIG. 1D describes the requesting device 120 as providing a request 222 to view test results 212 associated with the test suites.

The user/device authorization system 100 may receive the request 222 and determine whether the user is authorized to effectuate the request 222. For example, the request 222 may be provided via an API call as described above. The user/device authorization system 100 may then validate the request 222. For example, the system 100 may validate that the user of the requesting device 120 is authorized to provide the request 222. In some embodiments, the validation may be based on authentication information associated with the user. In some embodiments, the validation may be based on whether the request 222 comes from an authorized requesting device 120.

As described in FIGS. 1A-1B, the user of the requesting device may search for test devices which satisfy specified features. The requesting device 120 may provide the features to the user/device authorization system 100. The system 100 may then identify test devices which satisfy these specified features, and provide information identifying the test devices to the requesting device 120. Optionally, the user/device authorization system 100 may identify the test suites which the identified test devices are able to perform. For example, the system 100 may store information identifying device characteristics of the test devices and features which may be enabled on the test devices. The system 100 may utilize the information to determine which test suites are capable of being performed on a test device.

Optionally, the user of the requesting device 120 may specify a unique identifier associated with a test device. In contrast to the above description, in which the user specifies features of test devices, the user may identify a particular test device according to a device identifier, IP address, MAC address, and so on. For example, a test device 250 may execute a device agent 252 (e.g., a client). As will be described, the device agent 252 may communicate with the secure device access system 110 to effectuate the protocol described herein. Optionally, the device agent 252 may output the unique identifier (e.g., for presentation to the user, for storage by the systems 100, 110). The user may then specify the unique identifier, for example in the user interface described in FIG. 1A. In this way, the user may cause a particular test device to perform test suites. As an example, the user may be physically proximate to the particular test device. Thus, the user may prefer having the test suites performed via the proximate test device.

The user/device authorization system 100 may generate instructions 204 to be received by the secure device access system 110. For example, the instructions 204 may leverage APIs associated with the secure device access system 100. An example of instructions may include instructions to cause performance of test suites by the test device 250. In this example, the secure device access system 110 may generate test suite information 214 to be provided to the test device 250. As described above, test suite information 214 may optionally include one or more of drivers, test scripts, an application to be tested, components of an application to be tested, and so on.

The test device 250 may receive the test suite information 214 via the device agent 252. The device agent 252 may then validate that received instructions have come from the system 110. For example, the system 110 may sign the instructions according to a public key/private key scheme. As another example, the system 110 may include a token (e.g., an OAuth token) in the instructions. The device agent 252 may, in some embodiments, be a background mode daemon which polls the system 110 for instructions. In these embodiments, the device agent 252 may thus start when the test device 250 starts (e.g., powers on). In some embodiments, the device agent 252 may be explicitly started by a person (e.g., application designer, application tester, the user described above) with access to the test device 250. For example, the person may be located physically proximate to the test device 250 and may provide user input to start the device agent 252. As another example, the device agent 252 may be started via a network connection.

As described above, the device agent 252 may poll the secure device access system 110 for instructions (e.g., periodically). In response to the polling, the system 110 may determine whether it stores test information for the device agent 252. For example, the stored information may reflect unique identifiers associated with test devices. Thus, the system 110 may determine that it stores information identifying that testing is to be performed by a test device with a unique identifier associated with test device 250.

As illustrated, the device agent 252 has received test suite information 214 from the secure device access system 110. The test suite information 214 may relate to integration tests or end-to-end tests. With respect to integration tests, the test suite information 214 may enable testing related to combinations of components of an application being designed. For example, an integration test may include a test to determine whether high dynamic range video is outputting to a display connected to the test device 250. Thus, for integration testing the device agent 252 may execute the test suites. The device agent 252, for example, download portions of an application. As described above, these portions may be portions of an application being developed. Thus, the integration testing may test functionality which is performed by one or portions of the application. An example of an integration test may include testing decoding/encoding of streaming content. In this example, the device agent 252 may interact with system libraries, hardware, and so on, to test the decoding/encoding.

With respect to end-to-end testing, an application 252 (e.g., a publicly available or full application) may be tested. The device agent 252 may optionally obtain the test suite information 214 via representational state transfer (REST) API calls. It should be appreciated that end-to-end testing may enable testing of functionality that would be utilized by end-users. Thus, while integration testing may ensure that specific components, and combinations thereof, work as expected, end-to-end testing may ensure that the application 254 (e.g., as a whole) works as expected.

In the example of end-to-end testing, the test device 250 may thus include a version of the application 254 being tested. Optionally, the device agent 252 may obtain a version of the application 254, and install it on the test device 250. To enable the test suite information 214 to test the application 254, the application 254 may include a WebSocket patch 256 which responds to instructions from the device agent 252. For example, the WebSocket patch 256 may respond to instructions via a local proxy established via the device agent 252. As another example, the WebSocket patch 256 may open a port and listen for instructions from the device agent 252. The device agent 252 may provide instructions that mimic certain types, or patterns, of user input which real-world end-users may provide. The instructions may also relate to performance of certain actions by the application 254. Example actions may include rendering video data at a certain resolution, outputting audio in a particular surround sound format, retrieving certain video data from a streaming video server, and so on.

In the example of a video streaming application, the test suite information 214 may cause the application 254 to stream video content. Since streaming of video content may consume bandwidth, for example of an end-user, the device agent 252 may establish schemes to limit the consumed bandwidth. For example, the device agent 252 may establish a local proxy server to which the application 254 may connect. In the test suite information 214 the secure device access system 110 may include a particular video clip. The device agent 252 may then cause this particular video clip to loop, and thus the application 254 will stream the looped video clip via the local proxy connection. In this way, testing may be performed without consuming bandwidth of the end-user.

In some embodiments, the application 254 may be a custom application configured to download, via the WebSocket patch 256, any application which is being tested. For example, the application being tested may be an HTML5 application. Thus, the WebSocket patch 256 may download the HTML5 application via a WebSocket connection.

Subsequent to completion of the test suites, the device agent 252 may provide result information 252 to the secure device access system 110 for storage. As described in FIG. 1D, the secure device access system 110 may then provide test results 212 upon receipt of an authorized request from the user/device authorizations system. As illustrated in FIG. 1C, the test results 212 may be presented via the requesting device 120.

Example Flowcharts

Figure 3:
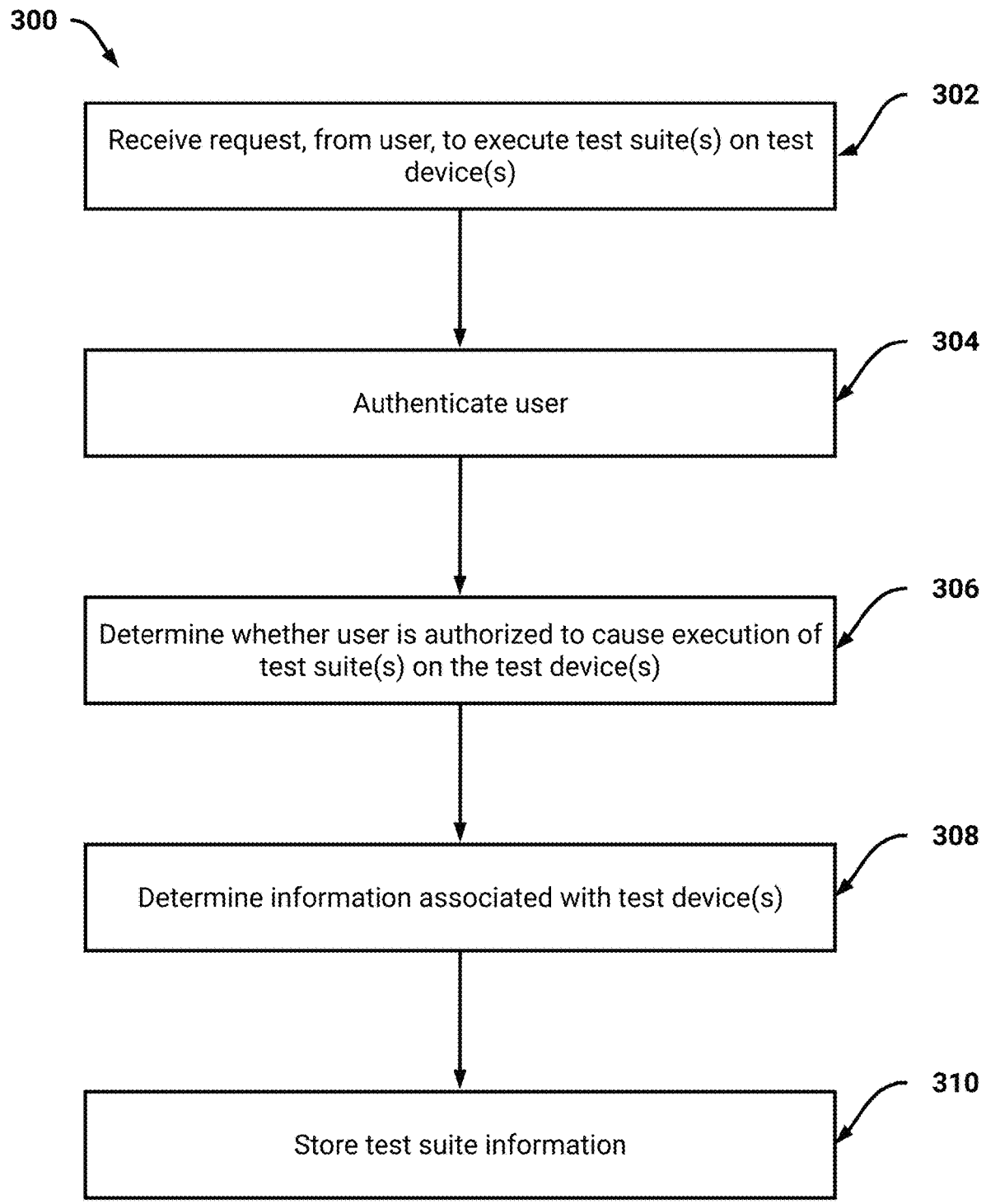
FIG. 3 illustrates a flowchart of an example process for registering test suites to be executed on a test device.

FIG. 3 illustrates a flowchart of an example process 300 for registering test suites to be executed on a test device. For convenience, the process 300 will be described as being performed by a system of one or more computers. For example, the system may comprise the user/device authorization system 100 and secure device access system 110 described above. In this example, the systems 100, 110 may be in communication via a network (e.g., a local or wide area network, the internet, and so on). The systems 100, 110 may also represent components of the system described below, such as services performed, or effectuated, by the system.

At block 302, the system receives a request from a user to execute one or more test suites. As described above, the user may utilize a user interface to enable selection of at least one test device to perform testing. For example, the user may specify features associated with test devices. The system may identify test devices which satisfy the features. As an example, the test devices may periodically register with the system. Examples of registering may include providing an anonymized device identifier, optionally along with hardware and software features associated with the test device. In this way, the system may determine which test devices satisfy the user's specified features. As another example, the user may specify one or more anonymized device identifiers associated with test device. In this example, the user may thus prefer that specific test devices be utilized to perform testing. Additionally, the system may present indications of test suites which may be performed via the selected test device. The user may then select from among the test suites.

At block 304, the system authenticates the user and at block 306 determines whether the user is authorized to cause execution of the test suites on the selected test device. As described above, the system may validate that the user is authorized to initiate testing on a test device.

At block 308, the system determines information associated with test devices. As described above, test devices may periodically register with the system. In some embodiments, the test devices may register once with the system. For example, the test devices may provide unique identifiers along with information identifying associated software and hardware features of the test devices. Thus, block 308 may be performed periodically (e.g., every hour, every day, and so on), or upon an initial start of a test device. To determine information associated with a test device, the test device may utilize a device agent to obtain the hardware and software features of the test device. Optionally, the device agent may monitor use of the test device. For example, the device agent may determine that the test deice is capable of outputting high dynamic range video content through identifying that the test device has outputted such video content.

Additionally, the system may determine the information in some embodiments. For example, the system may be in communication with a video streaming system or platform. In this example, the system may receive information identifying that a device associated with a unique identifier (e.g., anonymized identifier) has streamed video content at a particular resolution or with high dynamic range enabled. Thus, the system may correlate the information received from the video streaming system or platform with the unique identifiers of test devices which register with the system.

At block 310, the system stores test suite information. Upon validation that the user is authorized to initiate testing on the test device, and optionally upon validation the test device may perform the test suites, the system may store the test suite information. For example, the system may associate the test suite information with a test identifier, such that the testing may be monitored. As described above, the test device implicated by the testing may poll the system to obtain test suite information. If the system stores test suite information for the test device, the test device may obtain, and then perform, the associated tests.

Figure 4:
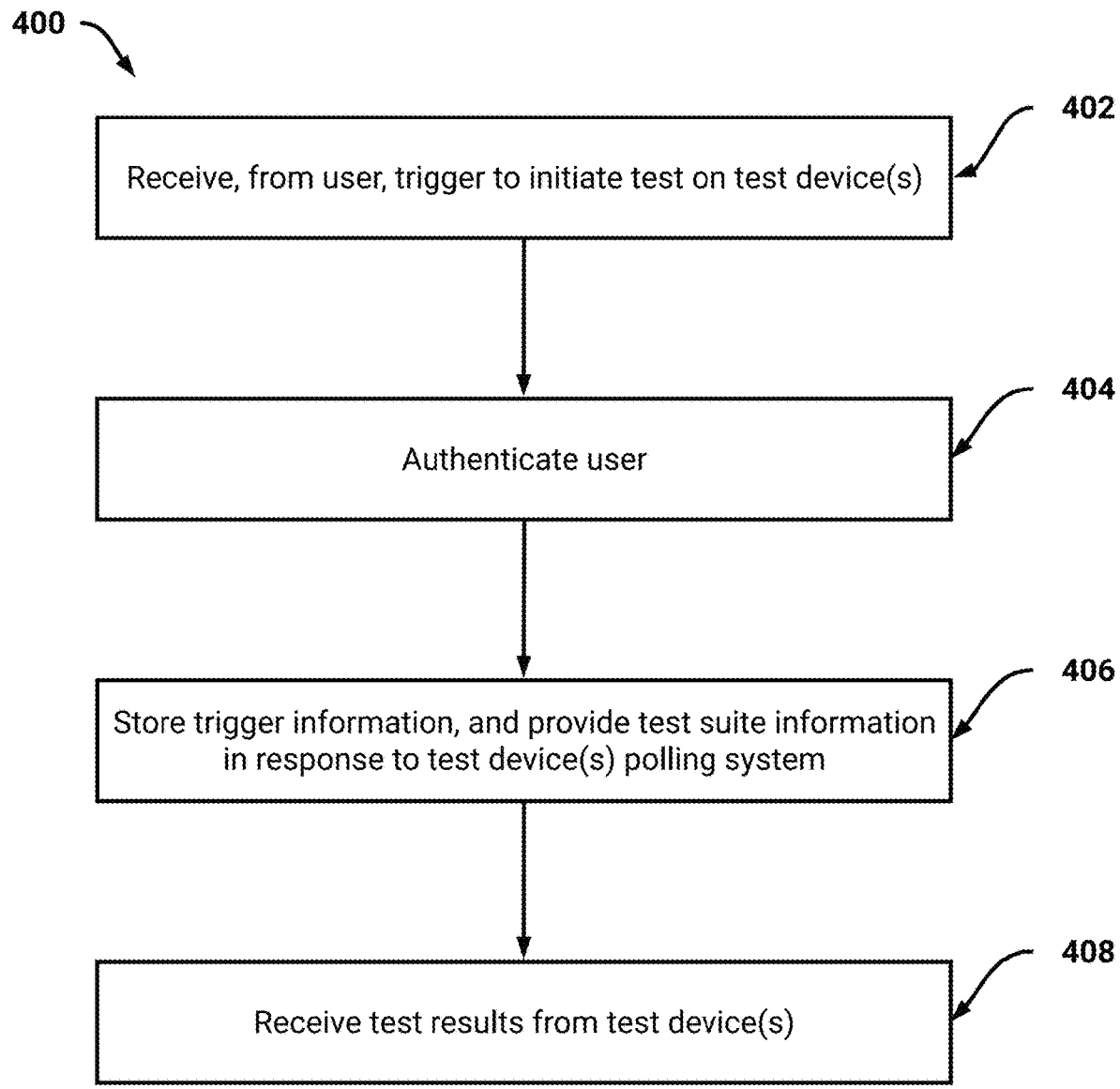
FIG. 4 illustrates a flowchart of an example process for receiving test results associated with executed test suites.

FIG. 4 illustrates a flowchart of an example process 400 for receiving test results associated with executed test suites. For convenience, the process 400 will be described as being performed by a system of one or more computers. For example, the system may comprise the user/device authorization system 100 and secure device access system 110 described above. In this example, the systems 100, 110 may be in communication via a network (e.g., a local or wide area network, the internet, and so on). The systems 100, 110 may also represent components of the system described below, such as services performed, or effectuated, by the system.

At block 402, the system information from the user to trigger initiation of a test. For example, FIG. 3 describes a user selecting test suites to be performed by test devices. The system may optionally cause the tests to be performed, or may cause the tests to be performed once triggered by the user.

At block 404, the system authenticates the user, and at block 406 the system provides test suite information to a test device. As described in FIG. 3, the system may store the test suites selected by the user. Each test device may periodically poll the system to determine whether it is to perform testing. Thus, the system may provide test suite information to a test device in response to the polling. When polling the system, each test device may provide a unique identifier (e.g., anonymized identifier) associated with the test device. For example, the unique identifier may be generated by a device agent executing on each test device. Thus, the system may utilize the unique identifier to identify whether the test device is to perform testing. Optionally, the system may push information to a test device in lieu of waiting for the test device to poll the system. If the test device is being utilized (e.g., presently being utilized, or historically utilized at a present time), the test deice may store the received test information. In this way, the test device may perform the testing when it is no longer being utilized or predicted to be utilized.

At block 408, the system receives test results from the test device. Upon completion of the testing, the test device may provide the test results to the system for storage. As described in FIGS. 1C-1D, the system may optionally aggregate the received test results prior to providing the test results to the requesting user.

Figure 5A:
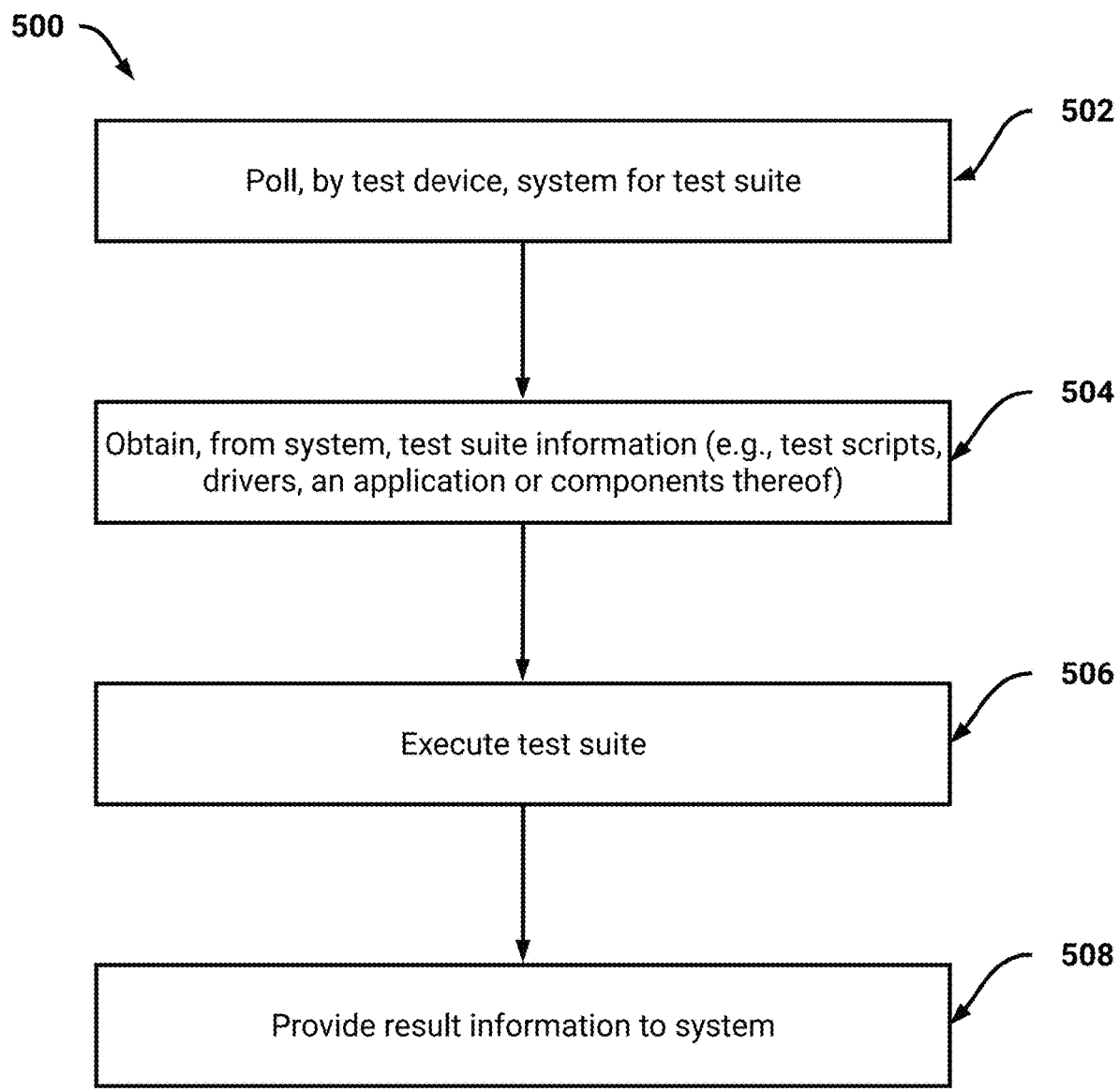
FIG. 5A illustrates a flowchart of an example process for executing integration test suites on a test device.

FIG. 5A illustrates a flowchart of an example process 500 for executing integration test suites on a test device. For convenience, the process 500 will be described as being performed by a user device of one or more processors (e.g., test device A 152A).

At block 502, the user device polls a system for test suites to be performed. For example, the system may poll the system described at least in FIGS. 4-5.

At block 504, the user device obtains test suite information from the system. The test suite information may comprise drivers, test scripts, portions of an application (e.g., components of an application), and so on, which are associated with a test suite. Optionally, the test suite information may identify a network location at which the user device may securely obtain the drivers, test scripts, portions of an application, and so on.

At block 506, the user device executes the test suite. As described in FIG. 2, the user device may execute a device agent. The device agent may perform the test suite. For example, the test suite may cause particular functionality of an application being designed to be tested. Thus, the device agent may execute this particular functionality according to the test suite information.

At block 508, the user device provides result information to the system. Upon completion of the test suite, the user device may provide test results to the system. The test results may be determined according to the test suite information. For example, a test script may be followed (e.g., a JavaScript test) by the user device. The test script may product certain output, and the output may then be provided to the system.

Figure 5B:
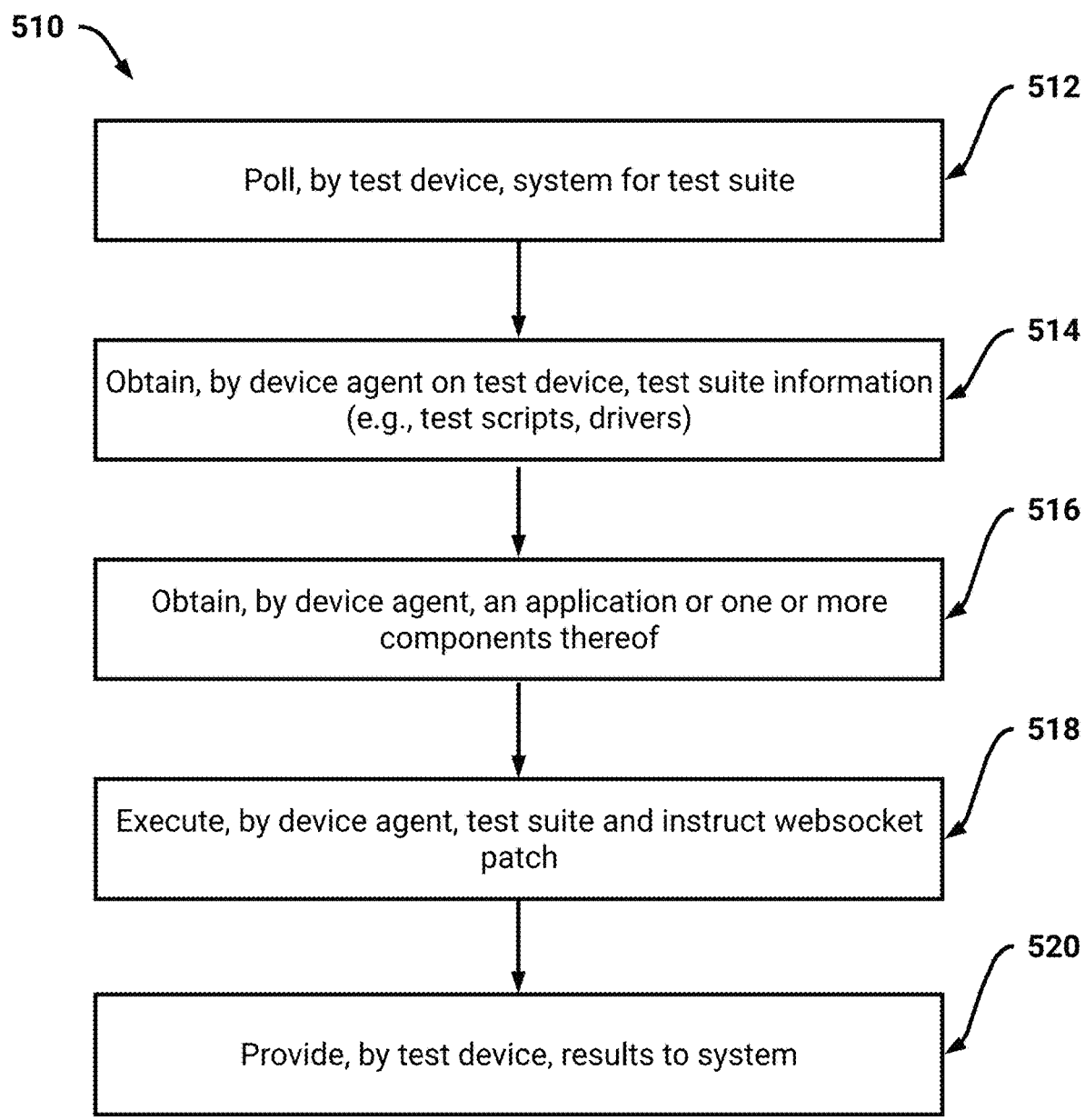
FIG. 5B illustrates a flowchart of an example process for executing end-to-end test suites on a test device.

FIG. 5B illustrates a flowchart of an example process for executing end-to-end test suites on a test device. For convenience, the process 500 will be described as being performed by a user device of one or more processors (e.g., test device A 152A).

At block 512, the user device polls a system for test suite information, and at block 514 the user device obtains the test suite information. At block 516 the user device optionally utilizes the device agent on the user device to download a testing application. The testing application may represent a current version of a full application undergoing end-to-end testing. In some embodiments, the user device may have the testing application already installed.

At block 518, the user device executes a test suite. As described in FIG. 2, a device agent included on the user device may perform the test suite. In the example of end-to-end testing, the user device may utilize the device agent to provide instructions to the testing application. For example, the device agent may provide instructions to the application via a WebSocket patch. The testing application may then receive the instructions via the WebSocket patch, and perform the testing.

At block 520, the user device provides the test results to the system as described above.

Figure 6:
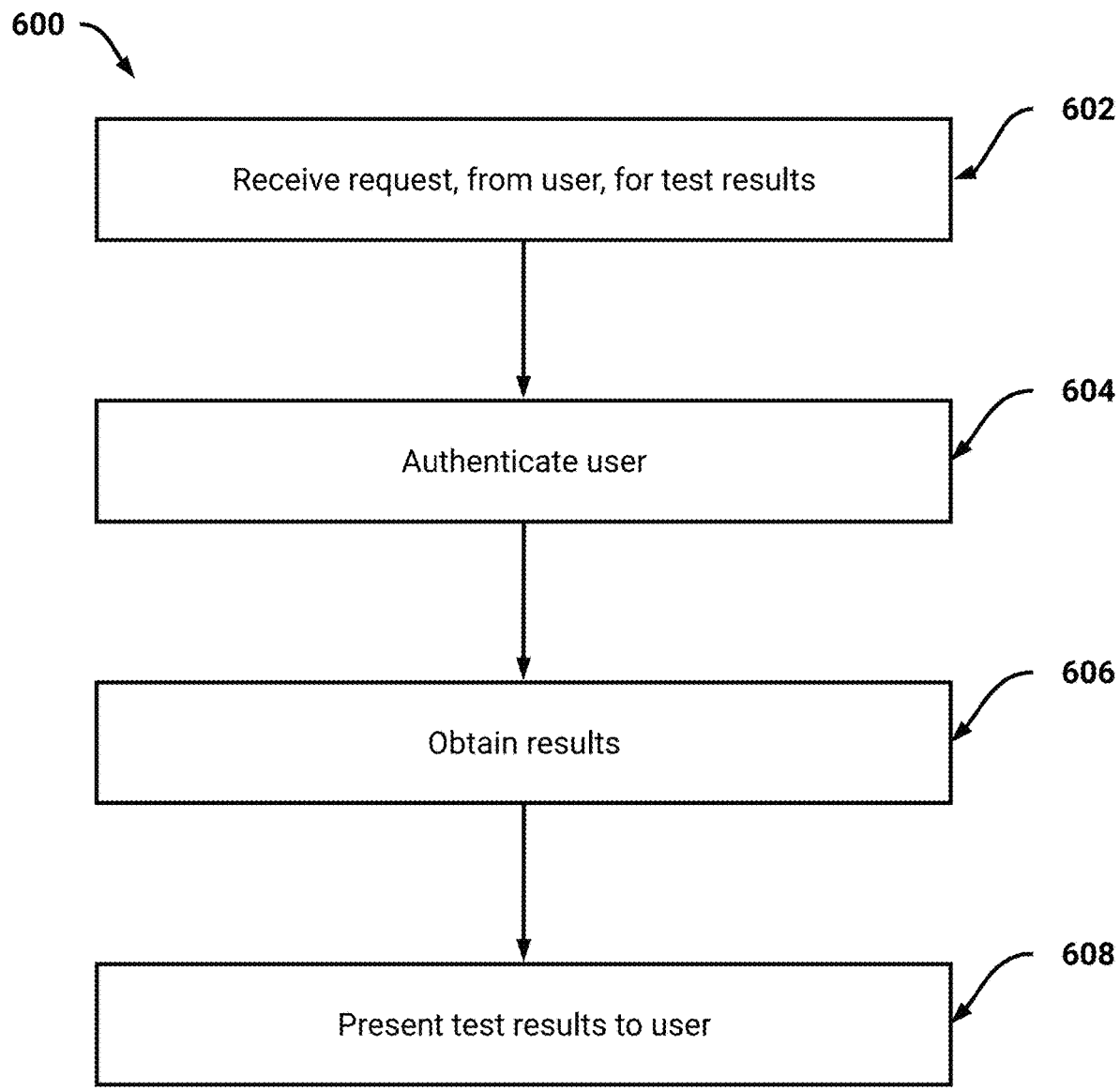
FIG. 6 illustrates a flowchart of an example process for presenting test results associated with executed test suites.

FIG. 6 illustrates a flowchart of an example process 600 for presenting test results associated with executed test suites. For convenience, the process 600 will be described as being performed by a system of one or more computers. For example, the system may comprise the user/device authorization system 100 and secure device access system 110 described above. In this example, the systems 100, 110 may be in communication via a network (e.g., a local or wide area network, the internet, and so on). The systems 100, 110 may also represent components of the system described below, such as services performed, or effectuated, by the system.

At block 602, the system receives a request from a user for test results, and at block 604 the system validates that the user is authorized to receive the test results. For example, the system may determine that the user initiated the testing which caused the test results to be generated.

At block 606, the system obtains the test results. The system, for example the user/device authorization system 100, may instruct the secure device access system 110 to obtain the test results. The secure device access system 110 may then provide the test results to the user/device authorization system 100 for routing to a user device of the user. Optionally, the test results may be encrypted according to a public key associated with the user. Thus, the user/device authorization system 100 may not have access to the test results. Instead, the system 100 may route the encrypted information to the user device. The user may then cause the encrypted information to be decrypted (e.g., via a private key), and presented via the user device.

At block 608, the system causes the test results to be presented to the user. For example, the system may update a user interface presented on the user device. An example of a user interface presenting test results is illustrated in FIG. 1C.

Example System

Figure 7:
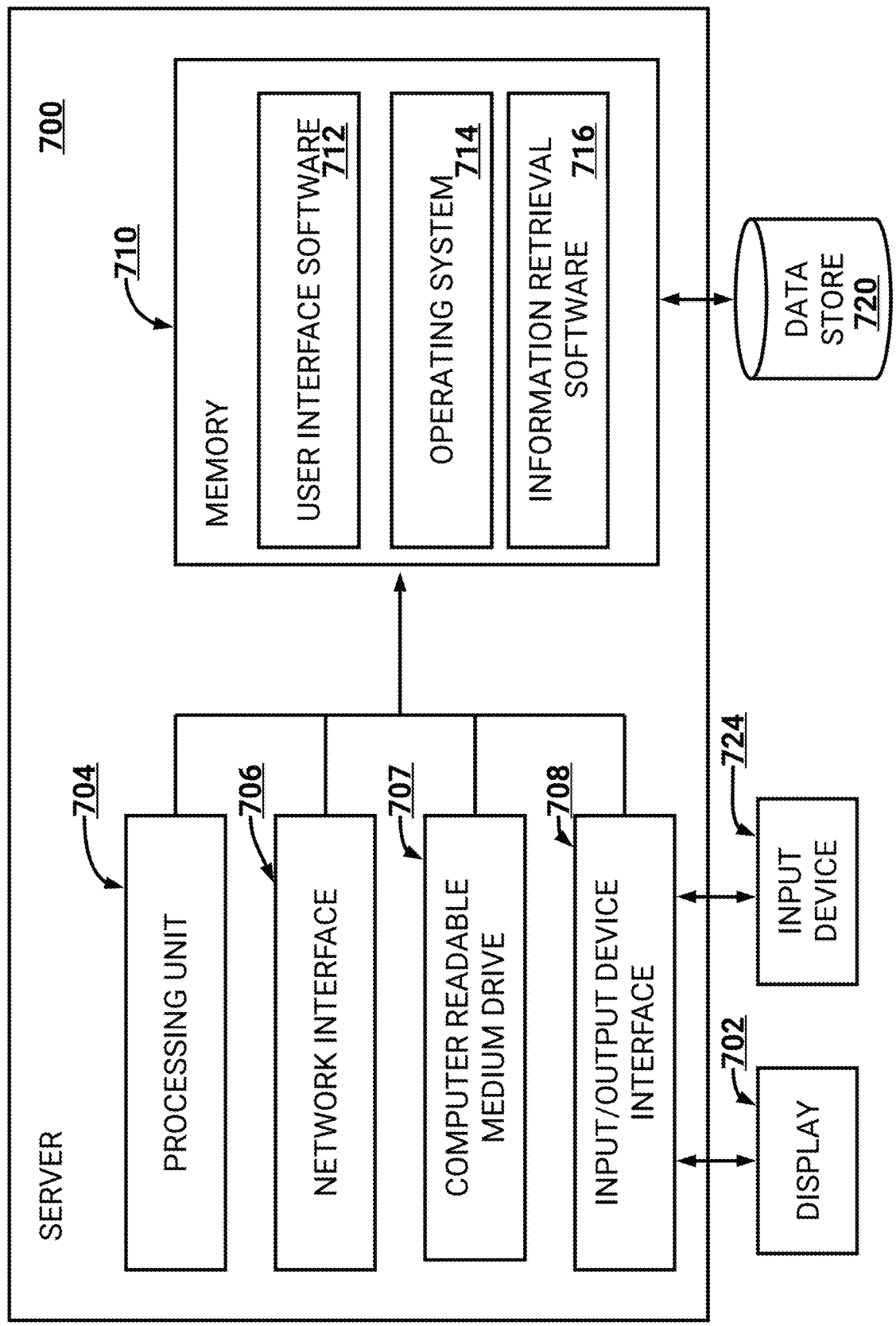
FIG. 7 is a block diagram depicting an illustrative configuration of one embodiment of a server than may implement elements of the systems described herein.

FIG. 7 is a block diagram depicting an illustrative configuration of one embodiment of a server 700 than may implement elements of the user/device authorization system 100 and/or secure device access system 110. The general architecture of server 700 depicted in FIG. 7 includes an arrangement of computer hardware and software components that may be used to implement aspects of the present disclosure. As illustrated, the server 700 includes a processing unit 704, a network interface 706, a computer readable medium drive 707, an input/output device interface 720, a display 702, and an input device 724, all of which may communicate with one another by way of a communication bus. The network interface 706 may provide connectivity to one or more networks or computing systems, such as to one or more clients, indexing systems, data storage systems, and so on. The processing unit 704 may thus receive information and instructions from other computing systems or services via a network. The processing unit 704 may also communicate to and from memory 710 and further provide output information for an optional display 702 via the input/output device interface 720. The input/output device interface 720 may also accept input from the optional input device 724, such as a keyboard, mouse, digital pen, etc. In some embodiments, the server 700 may include more (or fewer) components than those shown in FIG. 7. For example, some embodiments of the server 700 may omit the display 702 and input device 724, while providing input/output capabilities through one or more alternative communication channel (e.g., via the network interface 706).

The memory 710 may include computer program instructions that the processing unit 704 executes in order to implement one or more embodiments. The memory 710 generally includes RAM, ROM, and/or other persistent or non-transitory memory. The memory 710 may store an operating system 714 that provides computer program instructions for use by the processing unit 704 in the general administration and operation of the server 700. The memory 710 may further include computer program instructions and other information for implementing aspects of the present disclosure. For example, in one embodiment, the memory 710 includes user interface software 712 that generates user interfaces (and/or instructions therefor) for display upon a computing device, e.g., via a navigation interface such as a web browser installed on the computing device. In addition, memory 710 may include or communicate with one or more auxiliary data stores, such as data store 720, which may correspond to any persistent or substantially persistent data storage, such as a hard drive (HDD), a solid-state drive (SDD), network attached storage (NAS), a tape drive, or any combination thereof.

In addition to the user interface module 712, the memory 710 may include information retrieval software 716 that may be executed by the processing unit 704. In one embodiment, the information retrieval software 716 implements various aspects of the present disclosure. For example, determining ML models and proposing blocks for inclusion in a blockchain. As another example, evaluating proposed blocks and committing, or not committing, the proposed blocks into the blockchain. While the information retrieval software 716 is shown in FIG. 7 as part of the server 700, in other embodiments, all or a portion of the software may be implemented by alternative computing devices, such as virtual computing devices within a hosted computing environment.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module," as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop-down menu, a tool bar, a pop-up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method implemented by a system of one or more computers, the system implementing a protocol to enable secure initiation of test suites to be performed on test devices, the method comprising:

causing presentation, via a user device of a user, of an interactive user interface, wherein the interactive user interface:

receives user input specifying desired test device characteristics;

displays representations of each of a plurality of available test devices having the desired test device characteristics;

receives a user selection, from the plurality of available test devices, of a test device to perform testing associated with an application, the selected test device being authorized, by the system, for the user to select, and receives user input selecting one or more test suites, the test suites being indicated, by the system, as being capable of performance by the selected test device;

generating test suite information based on the selected test suites, and associating the test suite information with a unique identifier;

providing, in response to polling from the selected test device, the test suite information to the selected test device; and receiving, based on the unique identifier, test results from the selected test device, wherein the test results are routed for presentation via the interactive user interface.

2. The method of claim 1, wherein the user is associated with authentication information, and wherein the method comprises using the authentication information to determine whether the user is authorized to use the selected test device.

3. The method of claim 1, wherein the system comprises a first component and a second component, wherein the interactive user interface is associated with the first component of the system, and wherein generating test suite information comprises:

instructing, by the first component, the second component to generate the test suite information for the selected test device, wherein the first component instructs the second component based on an anonymized identifier associated with the selected test device, and wherein the second component stores information that associates the anonymized identifier with a network location at which the selected test device is accessible.

4. The method of claim 3, wherein the second component responds to polling from the selected test device by providing the generated test suite information to the selected test device.

5. The method of claim 1, wherein providing the test suite information comprises:

providing the test suite information to a device agent executing on the selected test device, the device agent causing performance of the testing.

6. The method of claim 5, wherein the testing comprises integration testing, wherein the integration testing tests one or more components of the application, and wherein the device agent performs the integration testing; or wherein the testing comprises end-to-end testing, wherein the selected test device executes a full version of the application, and wherein the device agent generates instructions to be provided to a component included in the application, the component enabling control of the application via the device agent.

7. The method of claim 1, wherein receiving test results comprises aggregating the test results with test results received from one or more other test devices.

8. The method of claim 1, wherein the plurality of available test devices include a user device of an end user, and the method comprises receiving authorization from the end user to make the user device available as test device.

9. A system comprising one or more computers and non-transitory computer storage media storing instructions that, when executed by the one or more computers, cause the one or more computers to perform operations, the system implementing a particular protocol to enable secure initiation of test suites to be performed on test devices, and the operations comprising:

receiving, from a user device, user input specifying desired test device characteristics for testing an application;

executing a search for available test devices having the specified test device characteristics;

generating, and outputting for display on the user device, an interactive user interface that displays representations of available test devices located by said search, the interactive user interface providing user functionality for selecting an available test device and for selecting one or more test suites associated with the application;

receiving, via a first component of the system and from the user device, testing information specifying user selections of a test device and one or more test suites, said user selections made via the interactive user interface;

generating, via a second component of the system and based on the selected one or more test suites, test suite information;

providing, via the second component and in response to polling from the test device, the test suite information to the selected test device; and receiving, via the second component, test results from the selected test device, wherein the test results are routed by the second component to the first component for presentation via the user device.

10. The system of claim 9, wherein the first component and the second component are respective services, each service being associated with particular application programming interface (API) calls of the particular protocol.

11. The system of claim 9, wherein the first component is configured to determine, based on user authentication information, whether a user of the user device is authorized to run a test on the selected test device.

12. The system of claim 9, wherein the first component is configured to validate that the selected one or more test suites are capable of being executed by the selected test device.

13. The system of claim 9, wherein the first component executes a web application accessible by the user device, wherein the web application causes the interactive user interface to be presented via the user device, and wherein the interactive user interface:

enables input of features associated with test devices, and causes presentation of test devices which satisfy the features, the presented test devices being available for selection.

14. The system of claim 13, wherein the second component receives, from a plurality of test devices, feature information specifying features associated with test devices, the test devices executing respective device agents which communicate with the second component according to the particular protocol, and wherein the first component obtains the feature information from the second component.

15. The system of claim 9, wherein the test suite information comprises one or more of drivers, test scripts, or components of the application to be tested.

16. The system of claim 9, wherein the available test devices include a user device of an end user, and the system is configured to determine whether the end user has provided authorization for the user device to be used as a test device.

17. Non-transitory computer storage media storing instructions that when executed by a system of one or more computers, cause the one or more computers to perform operations, the system implementing a particular protocol to enable secure initiation of test suites to be performed on test devices, and the operations comprising:

receiving, from a user device, user input specifying desired test device characteristics for testing an application;

executing a search for available test devices having the specified test device characteristics;

generating, and outputting for display on the user device, an interactive user interface that displays representations of available test devices located by said search, the interactive user interface providing user functionality for selecting an available test device and for selecting one or more test suites associated with the application;

receiving, via a first component of the system and from the user device, testing information specifying user selections of a test device and one or more test suites, said user selections made via the interactive user interface;

generating, via a second component of the system and based on the one or more selected test suites, test suite information;

providing, via the second component and in response to polling from the test device, the test suite information to the selected test device; and receiving, via the second component, test results from the selected test device, wherein the test results are routed by the second component to the first component for presentation via the user device.

18. The computer storage media of claim 17, wherein the first component and the second component are respective services, each service being associated with particular application programming interface (API) calls of the protocol.

19. The computer storage media of claim 17, wherein the first component determines, based on user authentication information, whether a user of the user device is authorized to run a test on the selected test device.

20. The computer storage media of claim 17, wherein the first component validates that the selected one or more test suites are capable of being executed by the selected test device.

21. The computer storage media of claim 17, wherein the first component executes a web application accessible by the user device, wherein the web application causes the interactive user interface to be presented via the user device, and wherein the interactive user interface:

enables input of features associated with test devices, and causes presentation of test devices which satisfy the features, the presented test devices being available for selection.

22. The computer storage media of claim 17, wherein the test suite information comprises one or more of drivers, test scripts, or components of the application to be tested.

23. The computer storage media of claim 17, wherein the available test devices include a user device of an end user, and the protocol determines whether the end user has provided authorization for the user device to be used as a test device.

* * * * *